US012799965B2

(12) United States Patent
Letcher et al.

(10) Patent No.: US 12,799,965 B2
(45) Date of Patent: Nov. 17, 2026

(54) SEALING CLIP FOR SEALING OPENINGS IN PANELS AND METHODS OF USE

(71) Applicant: Toyota Motor Engineering & Manufacturing North America, Inc., Plano, TX (US)

(72) Inventors: Brandon W. Letcher, New Hudson, MI (US); Paxton S. Williams, Milan, MI (US)

(73) Assignees: Toyota Motor Engineering & Manufacturing North America, Inc., Plano, TX (US); Toyota Jidosha Kabushiki Kaisha, Tokyo (JP)

( * ) Notice: Subject to any disclaimer, the term of this patent is extended or adjusted under 35 U.S.C. 154(b) by 45 days.

(21) Appl. No.: 18/921,477

(22) Filed: Oct. 21, 2024

(65) Prior Publication Data

US 2026/0110319 A1 Apr. 23, 2026

(51) Int. Cl.

| | |
|---|---|
| ***F16B 19/10*** | (2006.01) |
| ***B60J 10/36*** | (2016.01) |
| ***F16B 5/06*** | (2006.01) |
| ***F16B 19/00*** | (2006.01) |

(52) U.S. Cl.

CPC ........... *F16B 19/1027* (2013.01); *B60J 10/36* (2016.02); *F16B 5/0607* (2013.01); *F16B 19/008* (2013.01); *F16B 2005/0678* (2013.01)

(58) Field of Classification Search

CPC .. F16B 19/1027; F16B 5/0607; F16B 19/008; F16B 2005/0678; B60J 10/36

See application file for complete search history.

(56) References Cited

U.S. PATENT DOCUMENTS

| | | | | | |
|---|---|---|---|---|---|
| 3,313,083 | A * | 4/1967 | Flora | F16B 29/00 | 24/297 |
| 3,478,395 | A * | 11/1969 | Flora | F16B 5/0621 | 52/718.05 |
| 4,089,248 | A * | 5/1978 | Anscher | F16B 13/061 | 411/38 |
| 4,318,650 | A * | 3/1982 | LLauge | F16B 19/1072 | 411/43 |
| 4,878,790 | A * | 11/1989 | McSherry | F16B 13/0808 | 411/340 |

(Continued)

FOREIGN PATENT DOCUMENTS

| | | | |
|---|---|---|---|
| CN | 2058705 | U | 6/1990 |
| CN | 114809475 | A | 7/2022 |
| JP | 09159062 | A | 6/1997 |

*Primary Examiner* — David M Upchurch

(74) *Attorney, Agent, or Firm* — Dinsmore & Shohl LLP

(57) ABSTRACT

A sealing clip includes a body that includes a touch-off structure that extends outward from a side of a cover portion and configured to touch a first face of a panel. A plunger extends through a cover opening through the cover portion of the body, the plunger configured to extend through a panel opening through the panel and includes an enlarged seal at an end of the plunger configured to touch an opposite second face of the panel. The plunger is configured to retract relative to the body once the enlarged seal is inserted through the panel opening. The enlarged seal includes an elastic, flexible material that is configured to flatten toward the second face of the panel as the plunger is retracted relative to the body to a sealed configuration thereby pulling the end of the plunger toward the touch-off portion.

13 Claims, 5 Drawing Sheets

(56) References Cited

U.S. PATENT DOCUMENTS

| | | | | | |
|---|---|---|---|---|---|
| 5,078,561 | A * | 1/1992 | Wollar | F16B 37/005 411/38 |
| 5,207,750 | A * | 5/1993 | Rapata | F16B 13/061 411/908 |
| 5,425,609 | A * | 6/1995 | Smith | F16B 13/0808 411/80.6 |
| 5,690,454 | A * | 11/1997 | Smith | F16B 13/0808 411/908 |
| 6,746,191 | B2 * | 6/2004 | Edland | F16B 13/0808 411/45 |
| 7,600,956 | B2 * | 10/2009 | McDuff | F16B 13/0808 411/60.1 |
| 8,007,215 | B2 * | 8/2011 | Chen | F16B 13/0833 411/26 |
| 8,142,122 | B2 * | 3/2012 | McDuff | F16B 13/061 411/75 |
| RE44,016 | E * | 2/2013 | Remmers | F16B 13/04 411/63 |
| 9,453,524 | B2 * | 9/2016 | Sisto | F16B 13/0808 |
| 2004/0109737 | A1 * | 6/2004 | Kato | F16B 19/008 411/55 |
| 2007/0199276 | A1 | 8/2007 | Duque | |
| 2017/0102018 | A1 * | 4/2017 | Kanie | F16B 19/008 |
| 2021/0238854 | A1 | 8/2021 | Inch | |

* cited by examiner

SEALING CLIP FOR SEALING OPENINGS IN PANELS AND METHODS OF USE

TECHNICAL FIELD

The present specification generally relates to clips and, more specifically, to clips for sealing openings in panels and methods of their use.

BACKGROUND

Vehicle panels are often exposed to elements, such as rain and snow. Sometimes the panels have openings that can be used, for example, to connect parts to the panels. These openings can be passageways for water flowing through the openings.

What is needed are features that can be used to prevent water from coming through the openings.

SUMMARY

In accordance with one embodiment, a sealing clip includes a body that includes a touch-off structure that extends outward from a side of a cover portion and configured to touch a first face of a panel. A plunger extends through a cover opening through the cover portion of the body, the plunger configured to extend through a panel opening through the panel and includes an enlarged seal at an end of the plunger configured to touch an opposite second face of the panel. The plunger is configured to retract relative to the body once the enlarged seal is inserted through the panel opening. The enlarged seal includes an elastic, flexible material that is configured to flatten toward the second face of the panel as the plunger is retracted relative to the body to a sealed configuration thereby pulling the end of the plunger toward the touch-off portion.

In accordance with another embodiment, a method of sealing a panel opening through a panel using a sealing clip is provided. The method includes pushing an enlarged seal of a plunger of the sealing clip through the panel opening. The sealing clip includes a body that includes a touch-off structure that extends outward from a side of a cover portion and configured to touch a first face of the panel. The plunger extends through a cover opening through the cover portion of the body. The plunger is configured to extend through the panel opening and including the enlarged seal at an end of the plunger configured to touch an opposite second face of the panel. The plunger is configured to retract relative to the body once the enlarged seal is inserted through the panel opening in the panel. The enlarged seal includes an elastic, flexible material that is configured to flatten toward the second face of the panel as the plunger is retracted relative to the body to a sealed configuration thereby pulling the end of the plunger toward the touch-off portion. The plunger is retracted such that the enlarged seal is pulled against the second face of the panel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

A sealing clip includes a body with a touch-off structure that extends outward from a side of a cover portion and configured to touch a first face of a panel. A plunger extends through an opening through the cover portion of the body. The plunger is configured to extend through a panel opening through the panel and includes an enlarged seal at a first end of the plunger configured to touch an opposite second face of the panel. The plunger is configured to retract relative to the body once the enlarged seal is inserted through an opening in the panel. The enlarged seal comprising an elastic, flexible material that is configured to flatten toward the second face of the panel as the plunger is retracted relative to the body to a sealed configuration thereby pulling the end of the plunger toward the touch-off portion.

Figure 1:
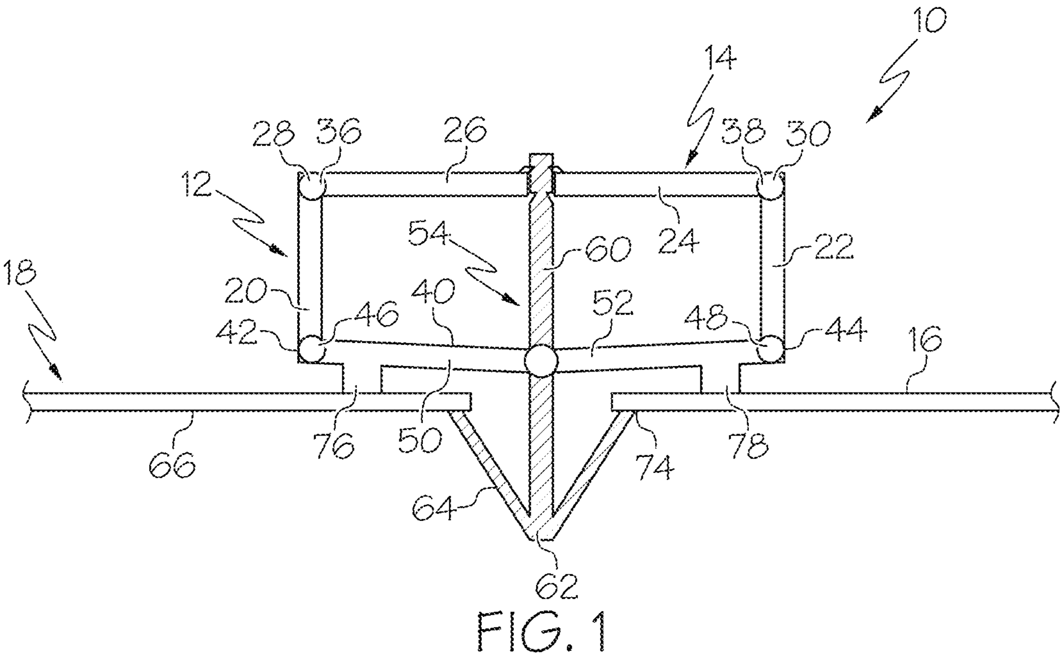
FIG. 1 depicts a side section view of a sealing clip in an initial configuration, according to one or more embodiments shown and described herein.
Figure 2:
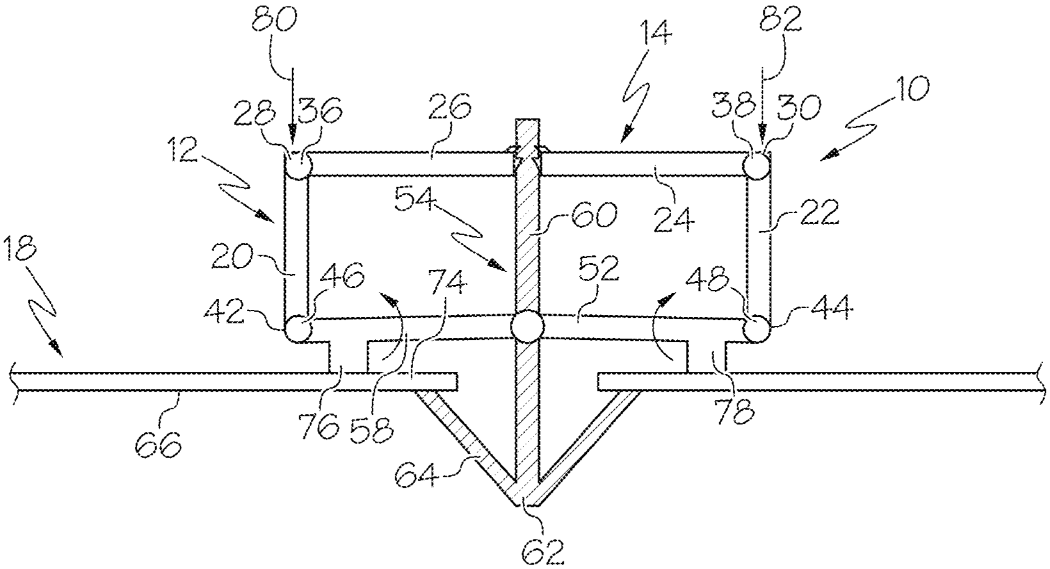
FIG. 2 depicts a side section view of the sealing clip in an intermediate configuration, according to one or more embodiments shown and described herein.

Referring to FIG. 1, a sealing clip 10 is shown in an insertion configuration and includes a body 12 that includes a touch-off structure 14 that is configured to touch a first face 16 of a panel 18, such as a vehicle panel or any other suitable panel, such as an outdoor panel for a building. The touch-off structure 14 includes one or more leg portions 20 and 22 (shown in section) that extend outward from a side 24 of a cover portion 26 at corners 28 and 30. Referring also to FIG. 2, the leg portions 20 and 22 may be separate, opposing leg portions; however, any suitable arrangement of leg portions can be used. Outer hinges, represented by areas 36 and 38, may be formed at the corners 28 and 30, which may be regions of reduced material thickness so that the leg portions 20 and 22 can more readily flex relative to the cover portion 26 than if the areas 36 and 38 were not present.

The leg portions 20 and 22 extend outward from the cover portion 26 to a base portion 40. The base portion 40 extends from the leg portions 20 and 22 at corners 42 and 44. Inner hinges, represented by areas 46 and 48, may be formed at the corners 42 and 44, which may be regions of reduced material thickness so that the base portion 40 can more readily flex relative to the leg portions 20 and 22. The base portion 40 may be formed of plunger connectors 50 and 52 that are connected to a plunger 54 at a flex region, represented by area 56. The flex region 56 may be a region of reduced material thickness so that the plunger connectors 50 and 52 can flex outward, away from the panel 18, as will be described in greater detail below.

Figure 3:
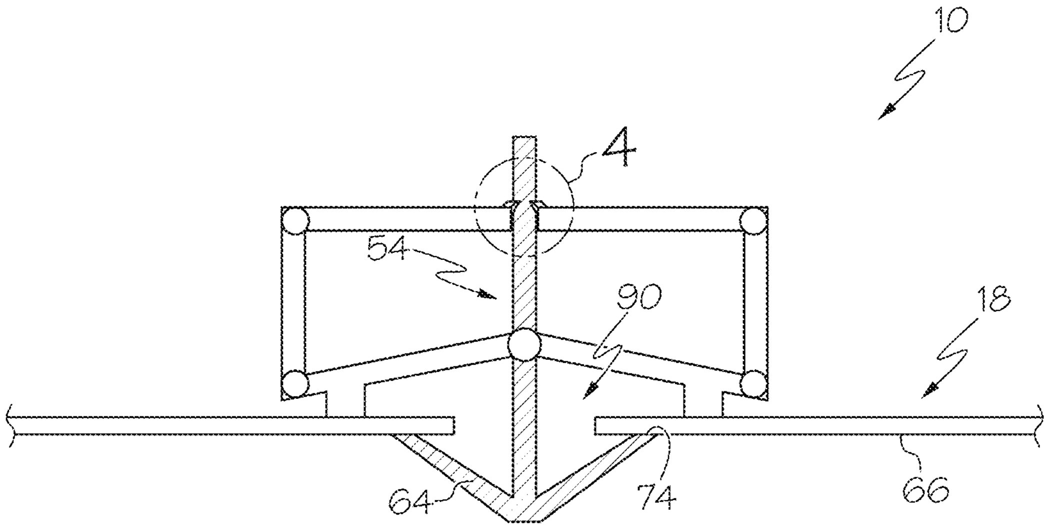
FIG. 3 depicts another side section view of the sealing clip in a sealed configuration with a plunger of the sealing clip fully retracted and locked in place, according to one or more embodiments shown and described herein.

The plunger 54 includes a barrel 60 that is connected at an end 62 to an enlarged seal 64. The barrel 60 is an elongated rod-like structure that has an inner portion 65 that extends from the enlarged seal 64 to the plunger connectors 50 and 52 and an outer portion 68 that extends from the plunger connectors 50 and 52 through an opening 70 in the cover portion 26 to a free end 72. The opening 70 facilitates retraction of the barrel 60 toward a sealed configuration (FIG. 3). The enlarged seal 64 may be somewhat cup-shaped and formed of an elastic, flexible material, such as rubber, plastic, or any other suitable material that is configured to flatten toward a second face 66 of the panel 18 as the plunger 54 is retracted relative to the touch-off structure 14 to the sealed configuration.

Each of the plunger connectors 50 and 52 are connected to the barrel 60 using any suitable connection, such as during a molding process, welding, etc. In some embodiments, the plunger 54 or parts thereof, such as the enlarged seal 64 may be two-shot molded in order to use a material that is softer or otherwise different than the touch-off structure 14. The plunger connectors 50 and 52 are configured to flex toward the cover portion 26, which draws or pulls the plunger 54 toward the touch-off structure 14, which, during installation, pulls or draws the enlarged seal 64 toward the second face 66 and increases a sealing pressure between a perimeter 74 of the enlarged seal 64 and the second face 66.

The touch-off structure 14 includes feet 76 and 78 that extend outward from the plunger connectors 50 and 52. The feet 76 and 78 are offset from the corners 42 and 44 toward the plunger 54 to provide a torque that causes the plunger connectors 50 and 52 can to pivot when a downward force is applied at corners 28 and 30, as represented by arrows 80 and 82 shown in FIG. 2, which shows the sealing clip 10 in an intermediate configuration with the plunger 54 partially retracted and the enlarged seal 64 partially flattened against the second face 66.

Figure 5:
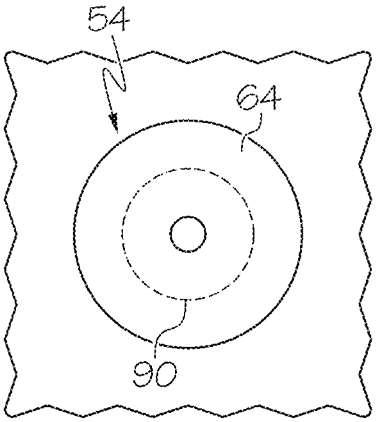
FIG. 5 is a partial view of a second face of a panel showing an enlarged seal of the plunger of FIG. 3, according to one or more embodiments shown and described herein.

FIG. 3 illustrates the sealing clip 10 in the sealed configuration with the plunger 54 in a fully retracted position. In the sealed configuration, an increased amount of sealing pressure is applied between the perimeter 74 of the enlarged seal 64 and the second face 66. The sealing pressure is sufficient to create a fluid-tight seal between the enlarged seal 64 and the second face 66 about an entire perimeter of opening 90 though the panel 18 (see FIG. 5 showing the enlarged seal 64 and the second face 66 of the panel 18).

Figure 4:
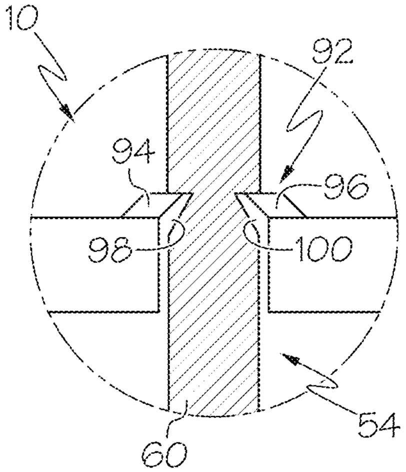
FIG. 4 is a detail view at area 4 of FIG. 3 showing a locking mechanism, according to one or more embodiments shown and described herein.

In some embodiments, referring to FIG. 4, the sealing clip 10 includes a mating locking mechanism 92 that is configured to lock the plunger 54 in the sealed configuration with the plunger 54 fully retracted. The locking mechanism 92 may include, for example, a pawl or locking projection 94 and 96 carried by the touch-off structure 14, such as at by the cover portion 26 at the opening 70. In the illustrated example, the locking projections 94 and 96 extend partially over the opening 70 in order to mate with corresponding notches 98 and 100 carried by the barrel 60 thereby locking the plunger 54 in the sealed configuration until a sufficient pushing force is applied to the free end 72 to release the locking projections 94 and 96 from the notches 98 and 100.

Figure 6:
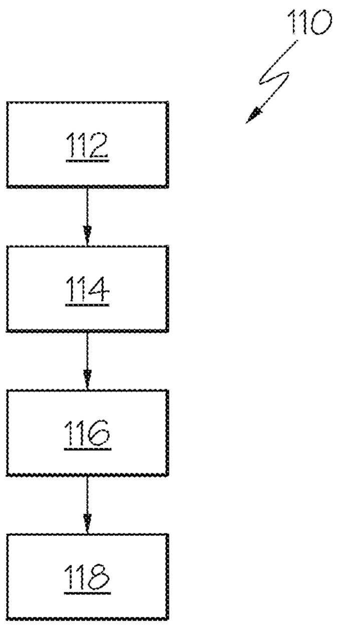
FIG. 6 illustrates a method of sealing a panel opening opening through a panel using the sealing clip of FIG. 1, according to one or more embodiments shown and described herein.
Figure 7:
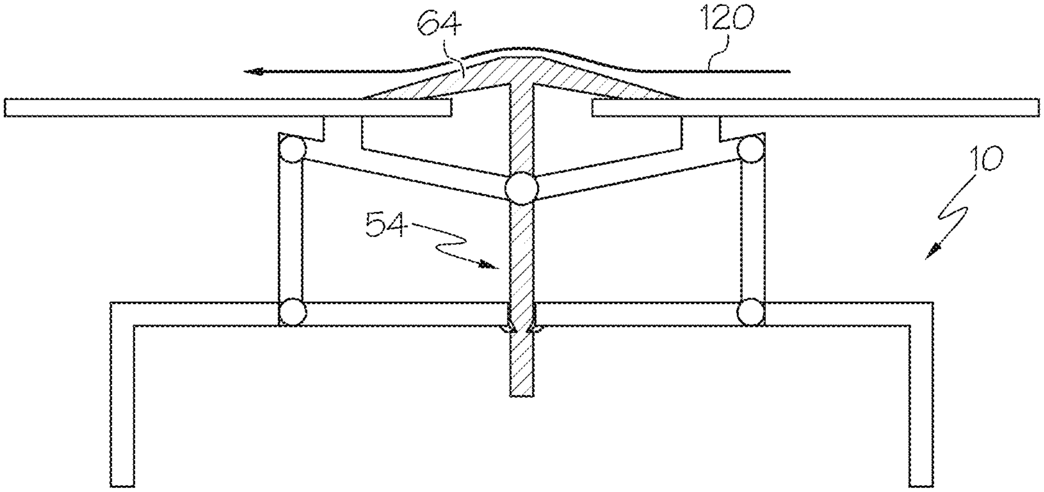
FIG. 7 depicts the sealing clip of FIG. 3 in operation, according to one or more embodiments shown and described herein.
Figure 8:
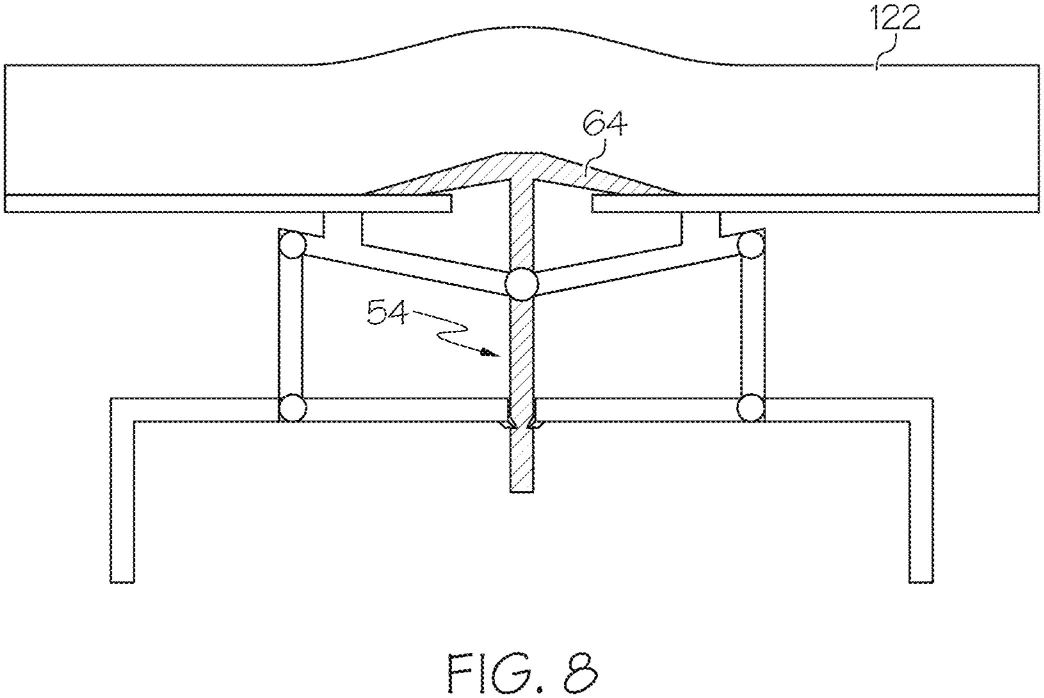
FIG. 8 depicts the sealing clip of FIG. 7 with another seal applied over the enlarged seal.

Referring now to FIG. 6, a method 110 of sealing the opening 90 through the panel 18 includes, at step 112, pushing the enlarged seal 64 through the opening 90 with the sealing clip 10 in the insertion configuration. In the insertion configuration shown by FIG. 1, the enlarged seal 64 occupies less footprint and is formed of a material flexible enough to bend due to pressure exerted by the perimeter of the opening 90 as the enlarged seal 64 is inserted and then resilient enough to expand back to its initial configuration in order to catch the second face 66 about the opening 90. At step 114, the feet 76 and 78 are touched off against the first face 16 of the panel 18 and a pressure is applied at the corners 28 and 30 (FIG. 2) toward the panel 18 causing the plunger connectors 50 and 52 to pivot about the feet 76 and 78 thereby pulling the enlarged seal 64 against the second face 66 of the panel 18 at step 116. At step 118, the plunger connectors 50 and 52 continue pulling on the plunger 62 until locking occurs using the locking mechanism 62 with the sealing clip 10 and plunger 64 in the sealed configuration (FIG. 3) providing a water-tight seal as represented by arrow 120 of FIG. 7. In some embodiments, a foam, sponge, gasket or other type of seal 122 may be applied over the enlarged seal 64. The enlarged seal 64 can be flattened out to reduce interference between the seal 122 and the panel 18 shown by FIG. 8.

Figure 9:
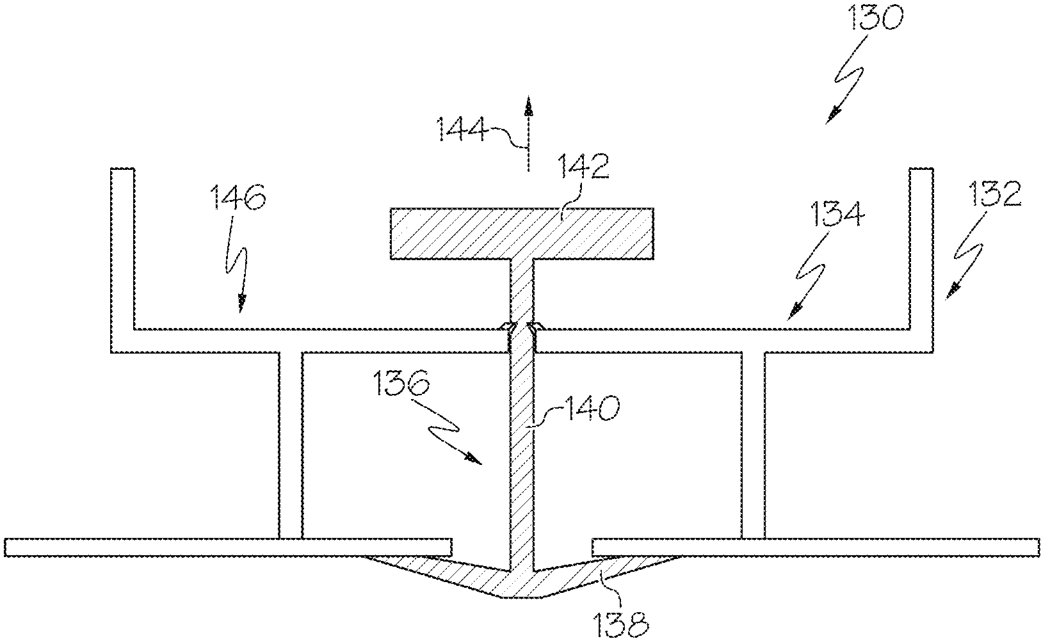
FIG. 9 depicts a side section view of another embodiment of a sealing clip, according to one or more embodiments shown and described herein.

While the sealing clip 10 described above may be considered a single direction installation since only pressure against the sealing clip 10 toward the panel 18 is needed, FIG. 9 shows a dual direction installation embodiment. A sealing clip 130 includes a body 132 that includes a touch-off structure 134 that is configured to touch a first face 16 of a panel 18 and a plunger 136 that includes an enlarged seal 138 and a barrel 140. In this embodiment, the barrel includes a handle 142 that can be pulled, represented by arrow 144 while the body 132 is pushed toward the panel 18, represented by arrow 146 to lock the plunger 136 in a sealed configuration similar to the sealed configuration discussed above.

The above-described sealing clips can be used to seal opening through panels from either direction because the seal is water tight. The clipping feature may or may not have a sponge or other seal on it or may or may not be two-shot with a softer material. The plunger has a locking mechanism with notches in the barrel area. The locking mechanism can be used to hold the plunger in a certain location, thus locking the plunger into its position. The location of the notches, relative to the locking projections, can be at a distance. The shorter the distance, the higher the retention force will be. This locking feature can be be tuned so that the plunger can be readily pushed into the opening through the panel and the locking mechanism engaged. The single direction sealing clip only requires one worker to install the sealing clip in one direction. The sealing clip can be installed in the same direction and the locking mechanism engaged. The enlarged seal can have a low-profile and be smooth. By providing a low-profile and smooth sealing surface, the sealing clip can be used in areas where a bulb seal or other seal can touch it and maintain good sealing. The single install direction feature can be changed to a dual install direction. The enlarged seal can be installed through the opening in the panel and the plunger can be pulled manually to secure the plunger in the sealed configuration.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sealing clip comprising:

a body comprising a touch-off structure that extends outward from a side of a cover portion and configured to touch a first face of a panel; and a plunger that extends through a cover opening through the cover portion of the body, the plunger configured to extend through a panel opening through the panel and including an enlarged seal at an end of the plunger configured to touch an opposite second face of the panel, where the plunger is configured to retract relative to the body once the enlarged seal is inserted through the panel opening, the enlarged seal comprising an elastic, flexible material that is configured to flatten toward the second face of the panel as the plunger is retracted relative to the body to a sealed configuration thereby pulling the end of the plunger toward the touch-off portion structure;

wherein a first corner connects the cover portion and a first leg of the touch-off structure and a second corner connects the cover portion and a second leg of the touch-off structure, the first and second legs extending outward from the cover portion to a base portion that extends between the first and second legs.

2. The sealing clip of claim 1, wherein the base portion includes a first plunger connector that extends outward from the first leg at a third corner and is connected to a barrel of the plunger, the barrel extending though the cover opening.

3. The sealing clip of claim 2, wherein the base portion includes a second plunger connector that extends outward from the second leg at a fourth corner and is connected to the barrel of the plunger.

4. The sealing clip of claim 3, wherein the first and second plunger connectors are configured to flex at the third and fourth corners toward the cover portion in response to a force applied to the body thereby moving the enlarged seal of the plunger toward the touch-off structure.

5. The sealing clip of claim 4, wherein the first plunger connector comprises a first foot that extends outward from the first plunger connector away from the cover portion, the first foot configured to contact the first face of the panel, the first foot being spaced inward toward the plunger from the first corner such that a torque is applied to the first plunger connector due to the force applied to the body.

6. The sealing clip of claim 5, wherein the second plunger connector comprises a second foot that extends outward from the second plunger connector away from the cover portion, the second foot configured to contact the first face of the panel, the second foot being spaced inward toward the plunger from the second corner such that another torque is applied to the second plunger connector due to the force applied to the body.

7. The sealing clip of claim 3, wherein the barrel includes an inner portion that extends from the enlarged seal to the first and second plunger connectors and an outer portion that extends from the first and second plunger connectors through the opening through the cover portion.

8. The sealing clip of claim 7 further comprising a locking mechanism that is configured to lock the plunger in the sealed configuration.

9. The sealing clip of claim 8, wherein the locking mechanism comprises a notch formed in the outer portion of the barrel and a locking projection carried by the cover portion.

10. The sealing clip of claim 8, wherein the locking projection extends into the cover opening.

11. A method of sealing a panel opening through a panel using a sealing clip, the method comprising:

pushing an enlarged seal of a plunger of the sealing clip through the panel opening, the sealing clip comprising:

a body comprising a touch-off structure that extends outward from a side of a cover portion and configured to touch a first face of the panel; and the plunger that extends through a cover opening through the cover portion of the body, the plunger configured to extend through the panel opening and including the enlarged seal at an end of the plunger configured to touch an opposite second face of the panel, where the plunger is configured to retract relative to the body once the enlarged seal is inserted through the panel opening in the panel, the enlarged seal comprising an elastic, flexible material that is configured to flatten toward the second face of the panel as the plunger is retracted relative to the body to a sealed configuration thereby pulling the end of the plunger toward the touch-off structure;

wherein a first corner connects the cover portion and a first leg of the touch-off structure and a second corner connects the cover portion and a second leg of the touch-off structure, the first and second legs extending outward from the cover portion to a base portion that extends between the first and second legs; and retracting the plunger such that the enlarged seal is pulled against the second face of the panel.

12. The method of claim 11, wherein the step of retracting the plunger is performed by the body.

13. The method of claim 11, wherein the step of retracting the plunger is performed manually.

* * * * *